United States Patent
Schütz

(10) Patent No.: US 9,167,139 B2
(45) Date of Patent: *Oct. 20, 2015

(54) SIMPLIFIED DEVICE OF A CAMERA UNIT OF A MOTOR VEHICLE

(75) Inventor: Heiko Schütz, Velbert (DE)

(73) Assignee: HUF HULSBECK & FURST GMBH & CO. KG (DE)

( * ) Notice: Subject to any disclaimer, the term of this patent is extended or adjusted under 35 U.S.C. 154(b) by 593 days.

This patent is subject to a terminal disclaimer.

(21) Appl. No.: 13/522,356

(22) PCT Filed: Jan. 13, 2011

(86) PCT No.: PCT/EP2011/050404
§ 371 (c)(1),
(2), (4) Date: Jul. 31, 2012

(87) PCT Pub. No.: WO2011/086132
PCT Pub. Date: Jul. 21, 2011

(65) Prior Publication Data
US 2012/0293656 A1 Nov. 22, 2012

(30) Foreign Application Priority Data

Jan. 15, 2010 (DE) .................. 10 2010 000 955
Jan. 25, 2010 (DE) .................. 10 2010 001 196

(51) Int. Cl.
*G03B 17/00* (2006.01)
*H04N 5/225* (2006.01)
(Continued)

(52) U.S. Cl.
CPC .............. *H04N 5/2254* (2013.01); *B60R 11/04* (2013.01); *B60R 2011/0082* (2013.01); *B60R 2011/0085* (2013.01); *B60R 2011/0092* (2013.01); *B60R 2011/0094* (2013.01)

(58) Field of Classification Search
CPC ....................................................... H04N 5/2254
USPC ......................................................... 396/419
See application file for complete search history.

(56) References Cited

U.S. PATENT DOCUMENTS 6,524,020 B2    2/2003  Ellinger
8,821,043 B2 *  9/2014  Schutz ........................ 396/419
(Continued)

FOREIGN PATENT DOCUMENTS

CN      1289927 A      4/2001
CN      1764272 A      4/2006
(Continued)

OTHER PUBLICATIONS

Chinese Office Action for corresponding application CN201180012816.0; Report Issued Sep. 28, 2014.
(Continued)

*Primary Examiner* — Rodney Fuller
(74) *Attorney, Agent, or Firm* — Cantor Colburn LLP

(57) ABSTRACT

A device for a motor vehicle has a camera unit, which can be brought into an inactive position and an active position includes a protective element, which can be guided into a closed position and an open position. In the closed position, the camera unit is in its inactive position behind the protective element, where it is inaccessible from the outside. In the open position, the camera unit is in its active position for image acquisition. The device further includes a drive unit for moving the camera unit and the protective element, wherein the camera unit and protective element are movably hinged to each other. A vehicle, particularly a motor vehicle, could be equipped with such a device.

29 Claims, 8 Drawing Sheets

(51) Int. Cl.
  *B60R 11/04*   (2006.01)
  *B60R 11/00*   (2006.01)

(56) References Cited

U.S. PATENT DOCUMENTS

| | | |
|---|---|---|
| 2002/0005897 A1 | 1/2002 | Kim |
| 2003/0146831 A1 | 8/2003 | Berberich et al. |
| 2004/0130622 A1 | 7/2004 | Lang |
| 2009/0231430 A1 | 9/2009 | Buschmann |
| 2009/0309971 A1 | 12/2009 | Schuetz |
| 2010/0260495 A1 | 10/2010 | Usami |
| 2012/0293656 A1 | 11/2012 | Schutz |

FOREIGN PATENT DOCUMENTS

| | | |
|---|---|---|
| CN | 101030305 A | 9/2007 |
| CN | 201071228 Y | 6/2008 |
| CN | 101506456 A | 8/2009 |
| CN | 101528506 A | 9/2009 |
| DE | 10013425 A1 | 9/2001 |
| DE | 10204764 A1 | 8/2003 |
| DE | 102005049566 A1 | 4/2006 |
| DE | 102006023103 A1 | 11/2007 |
| DE | 102006039192 A1 | 2/2008 |
| DE | 102006048373 A1 | 4/2008 |
| DE | 102008010966 A1 | 8/2009 |
| DE | 102009008281 A1 | 8/2010 |
| EP | 1529688 A1 | 5/2005 |
| JP | 11334471 A | 12/1999 |
| WO | 2011086131 A1 | 7/2011 |

OTHER PUBLICATIONS

Chinese Office Action issued May 5, 2014 re: Chinese Application No. 201180006044.X; citing: US 2003/0146831A1 and CN 101506456A.

International Search Report; International Application No. PCT/EP2011/050403; International Application Filing Date Jan. 13, 2011; Mail date Apr. 19, 2011.

International Search Report; International Application PCT/EP2011/050404; International Application Filing Date Jan. 13, 2011; Mail date May 11, 2011.

\* cited by examiner

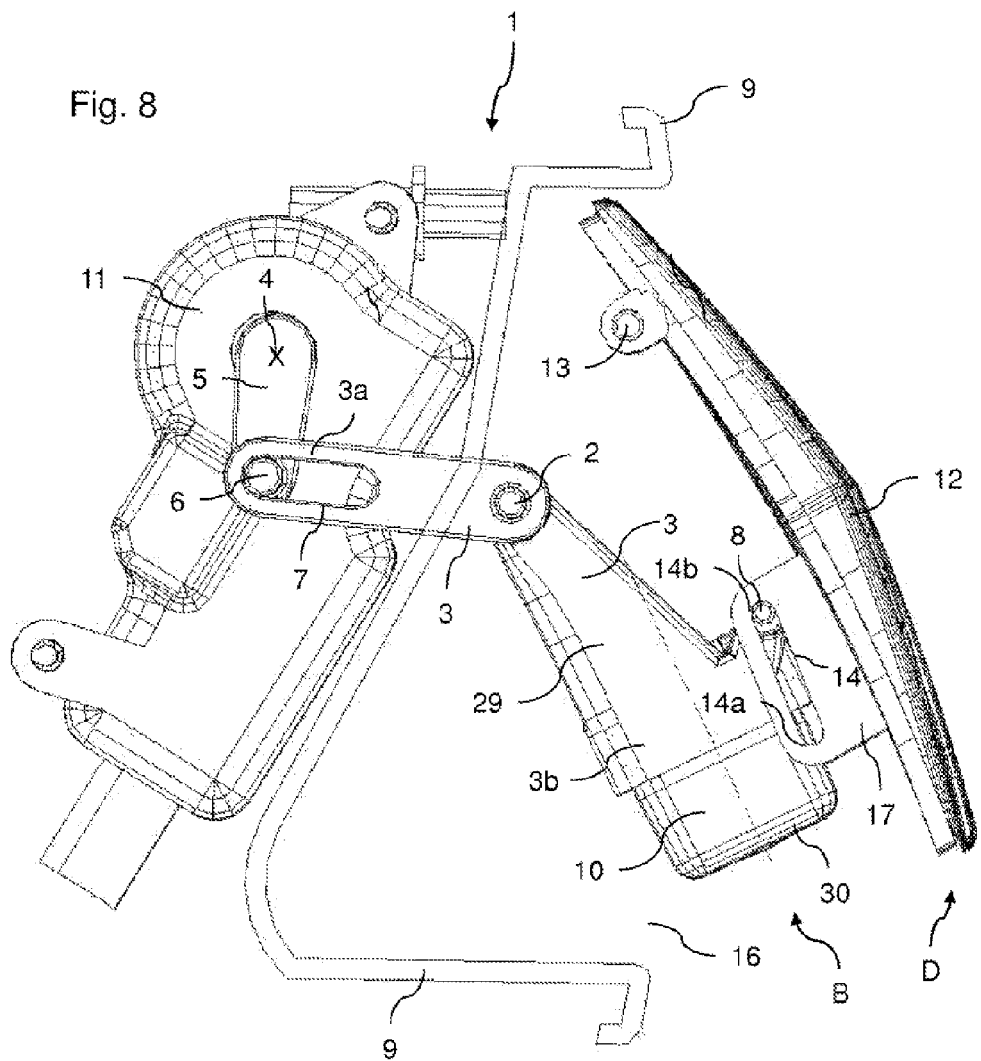

SIMPLIFIED DEVICE OF A CAMERA UNIT OF A MOTOR VEHICLE

TECHNICAL FIELD

The invention relates to a device that is intended for a motor vehicle and that has a camera unit, which can be brought into an inactive position and into an active position, and has a protective element, which can be guided into a closed position and into an open position, so that in the closed position of the protective element the camera unit is in its inactive position behind the protective element, where it is inaccessible from the outside, and in the open position of the protective element the camera unit is in its active position for image acquisition, and the device has a drive unit for moving the camera unit and the protective element. Furthermore, the invention relates to a motor vehicle with a camera unit.

BRIEF DESCRIPTION OF RELATED ART

The use of cameras or more specifically a camera unit for detecting the surrounding area of a vehicle is known from the prior art. Such camera units are used, for example, as parking aids and/or maneuvering aids for motor vehicles, in order to detect, in particular, the areas around the vehicle that cannot be seen with conventional mirrors of motor vehicles.

DE 100 13 425 A1 discloses a holding device that is intended for a camera and that serves to detect the surrounding area of the vehicle. The holding device is attached to the body of the vehicle and can be moved or folded out of the vehicle body in order to detect the surrounding area of the vehicle. In this case the camera is rigidly fastened to the holding device, so that when the holding device is moved out, the camera is also moved out simultaneously along with said holding device. Such a camera arrangement is inflexible, has a very high installation space requirement and protects the camera in the retracted state only under certain conditions, because the lens of the camera is aimed at an oblique angle relative to the opening or more specifically relative to the cover. Such a camera arrangement makes the camera vulnerable even in the closed state.

EP 1 529 688 A1 discloses a camera arrangement for motor vehicles with a camera unit for image acquisition, wherein the camera unit is arranged behind a pivotable protective element, so that in an inactive position it is essentially inaccessible from the outside. In the case of this device the camera unit is fastened directly to the protective element. It has been found that the drawback with such a device is that the direct arrangement of the camera at the protective element is susceptible to trouble. Due to the effects of weather and wear phenomena, the protective element no longer forms a satisfactory seal after a certain period of time, so that the camera unit, fastened to the protective element, is exposed to certain adverse effects of dirt and moisture. Therefore, in particular, the lenses of the video camera have to be cleaned frequently. Furthermore, owing to the direct arrangement of the camera at the protective element, the camera can be easily damaged by jolting or bumping the protective element.

An additional device that is intended for a motor vehicle and that has a movably mounted camera unit is known from DE 10 2006 048 373 A1. The camera unit can be brought into an inactive position and into an active position by means of a motor. Furthermore, a rotatably mounted protective element can be moved into a closed position and into an open position. The drawback with this device is that the motor has a first mechanism for moving the camera unit and a second mechanism for moving the protective element. This arrangement makes the design of the device more complicated. That is, the device requires a relatively large number of components, so that the manufacture of such a device is also cost intensive.

BRIEF SUMMARY

Therefore, the invention provides a simple and inexpensive device for a motor vehicle with a camera unit that avoids the aforementioned drawbacks. In particular, the device shall have few components, shall have a compact design and shall provide effective protection for the camera unit, especially in the retracted state. Furthermore, a vehicle with a simple and inexpensive device with a camera unit shall be provided.

The features and the details, which are described in connection with the device according to the invention, also apply, as a matter of fact, to the motor vehicle according to the invention and vice versa, so that any reference to the disclosure of the individual aspects of the invention has to be regarded in terms of their interrelationship.

The first aspect of the invention provides means of a device that is intended for a motor vehicle and that has a camera unit, which can be brought into an inactive position and into an active position, and that has a protective element, which can be guided into a closed position and into an open position, so that in the closed position of the protective element the camera unit is in its inactive position behind the protective element, where it is inaccessible from the outside, and in the open position of the protective element the camera unit is in its active position for image acquisition, and the device has a drive unit for moving the camera unit and the protective element. In this case the device is characterized in that the camera unit and the protective element are movably hinged together.

Since the camera unit and the protective element are movably hinged together—that is, are connected together so as to be movable relative to each other—the device can have a compact design, the camera in its inactive position can be well protected and in its active position can be arranged flexibly and optimally for detecting the surrounding area of the vehicle. In particular, since the camera unit and the protective element are movably connected together, it is possible to use very few components for the device, especially for the drive unit, because when one of the two elements moves, the other element also moves simultaneously with it.

Preferably the camera unit and the protective element are fastened to each other in a rotatable and/or pivotable manner. This feature can be achieved, for example, with a joint. Furthermore, an axle can be provided, for example, and both the camera unit as well as the protective element can be mounted rotatably about said axle. Since the camera unit and the protective element are coupled together in a rotationally movable manner, it is possible to pivot the camera unit, when the camera unit is transferred from the active position into the inactive position, in such a way that the lens or more specifically the objective of the camera unit points in the direction of the vehicle interior. This arrangement protects the lens or more specifically the objective of the camera unit and, thus, the camera unit in the inactive position. Dirt particles, which have penetrated the protective element in the direction of the camera unit despite the cover or more specifically the seal, because, for example, the seal of the protective element is worn, can impinge on the camera housing, but not directly into or on the objective. Furthermore, the rotationally movable and/or pivotally movable arrangement of the camera unit at the protective element provides that when the protective element is opened—that is, when the protective element is moved out of the closed position into the open position—the camera unit can be pivoted and/or rotated in such a way that the camera unit can be optimally oriented relative to the environment to be watched.

Preferably the device provides that the drive unit is operatively connected to the protective element in such a way that when the protective element moves between the closed position and the open position, the camera unit moves simultaneously relative to the protective element, or that the drive unit is operatively connected to the camera unit in such a way that when the camera unit moves between the inactive position and the active position, the protective element moves simultaneously relative to the camera unit. This means that irrespective of whether the camera unit and the protective element are moved by means of the drive unit, the element, which is moved by means of the drive unit, takes along with it the correspondingly other element. If the protective element is brought from the closed position into the open position by a force applied by the drive unit, then the protective element takes along with it the camera unit during the movement, so that said camera unit is brought from the inactive position into the active position in parallel to the movement of the protective element. If the protective element is closed by a direct influence of the force applied by the drive unit, then the protective element transfers the camera unit from the active position into the inactive position because both elements are movably connected together. As an alternative, the camera unit can also be moved by means of the drive unit. In this case the camera unit moves along with it the protective element owing to the movable connection. If the drive unit makes sure that the camera unit is moved from the active position into the inactive position, then when the camera unit moves, the camera unit transfers simultaneously the protective element from the open position into the closed position. The drive unit can be operatively connected to either the camera unit or the protective element. Irrespective of where the drive unit engages, both the camera unit and the protective element are always moved simultaneously due to the movable coupling of the camera unit and the protective element. As a result, only one single drive unit for both components is necessary, so that the costs can be cut as compared to a solution where both the camera unit and the protective element have to have their own drive unit.

The drive unit of the device can engage directly or indirectly with the camera unit or with the protective element, in order to move the camera unit and the protective element. For example, a driving element, in particular a movable driving element, of the drive unit can be arranged, in particular hinged, directly to the camera unit or to the protective element. As an alternative, a driving element, in particular a movable driving element, of the drive unit can be arranged, in particular hinged, indirectly—that is, by means of at least one additional intermediate element, such as an intermediate gear or a pivot arm—to the camera unit or to the protective element. The direct or indirect connection of the drive unit to the camera unit or the protective element can be provided as a function of the design and the size of the protective element and the camera unit. Owing to the drive unit, the camera unit and the protective element can be moved simultaneously, irrespective of whether the drive unit engages directly or indirectly with one of the two components.

A preferred further development of the invention can provide for the device that the protective element is arranged rotatably and/or pivotably about a first axle, and that the camera unit is mounted rotatably about a second axle. The first and the second axle are arranged preferably securely—that is, immovably—in or at the device. In an additional design variant of the device it is conceivable that at least one axle is arranged movably. The movable hinging or rather connection of the camera unit to the protective element enables both the camera unit as well as the protective element to be rotated or more specifically pivoted in each case about a stationary axle. As a result of this feature, the camera unit can follow the protective element, when this camera unit is pivoted about the first axle. Inversely the protective element can follow the camera unit, when this camera unit is pivoted about the second axle by means of the drive unit. When the camera unit and the protective element move, they remain connected together, but their position relative to each other changes.

An additional advantageous further development of the invention can provide for the device that the drive unit has a movable driving element, which is operatively connected to the camera unit or the protective element in order to move the camera unit or the protective element. The movable driving element of the drive unit serves, in particular, as a connection between a motor of the drive unit and the camera unit or the protective element. The drive unit, in particular a motor of the drive unit, moves the driving element, which in turn is operatively connected directly or indirectly to the camera unit or the protective element. Due to the movement of the driving element, the camera unit can be brought from the inactive position into the active position or vice versa, and the protective element can be brought from the closed position into the open position or vice versa.

The movable driving element of the drive unit can be designed in a variety of ways. One advantageous design variant of the device can provide that the movable driving element of the drive unit is at least a drive rod, which is fastened in a rotationally movable or pivotally movable manner to a linking mechanism at the camera unit or at the protective element, so that the at least one drive rod is movable by means of the drive unit. For example, the side of the drive rod facing the drive unit can be movably arranged at a rotatable crank of the drive unit, so that the drive rod follows the movement of the crank and, in so doing, moves the camera unit and the protective element. The crank is rotated preferably alternatingly clockwise and counterclockwise. In this way the drive rod can either pull the camera unit and the protective element to the drive unit in order to close said camera unit and protective element, or the drive rod can push the camera unit and the protective element away in order to open the camera unit and the protective element—that is, in order to transfer into the active position and into the open position respectively. The drive rod can also be designed, for example, like a telescope. When the drive rod is extended, this drive rod pushes the camera unit and the protective element into the active position and into the open position respectively, and, when the drive rod is retracted, said drive rod pulls the protective element and the camera unit back into the closed position and into the inactive position respectively. In this case the drive rod can be movably hinged to either the camera unit or the protective element. It is also conceivable that two or more drive rods, which are connected together by joints, are provided.

A preferred alternative embodiment of the device can provide for this device that the movable driving element of the drive unit is at least a cam or at least an eccentrically arranged disk, which rests against the camera unit or against the protective element in order to move the camera unit and the protective element, and in particular, that there is a resilient element, which is fastened to the camera unit or to the protective element and which prestresses the camera unit and the protective element against the at least one cam or the at least one eccentrically arranged disk, so that either the camera unit or the protective element rests permanently against the at least one cam or the at least one eccentrically arranged disk. The cam, in particular the eccentrically mounted cam, or the eccentrically mounted disk rests permanently against the camera unit or the protective element, owing to the spring tension of the resilient element. Preferably the resilient element is arranged at the camera unit or the protective element in such a way that the spring force of said resilient element enables the resilient element to pull the camera unit or the protective element against the circumferential edge of the cam or the disk respectively. This means, that owing to the spring force of the resilient element, the camera unit or the protective element rests permanently against the cam, in particular the circumferential edge of the cam, or against the eccentrically mounted disk, in particular against the circumferential edge of the eccentrically mounted disk. As result of this feature, the camera unit or the protective element follows the eccentric movement of the cam or the disk respectively, so that the eccentric movement of the cam or the disk respectively allows the camera unit and the protective element to be moved between their respective end positions. The cam, in particular the eccentrically designed cam, or the eccentrically mounted disk, represents the movable driving element of the drive unit. The drive unit provides for the eccentric movement of the cam or the disk. Preferably the cam or the disk is fastened to a drive shaft of the drive unit. When the drive shaft rotates, the cam or the disk is rotated in an eccentric manner about the drive shaft, in order to move accordingly the camera unit and the protective element. Since the camera unit and the protective element are movably connected together, it is immaterial whether the cam or the disk engages with the camera unit or with the protective element or whether the cam or the disk rests against the camera unit or against the protective element due to the spring force of the resilient element. The resilient element can be arranged in different ways in or at the device. For example, the resilient element can be designed as a compression spring or as a tension spring. The resilient element can be, for example, a helical spring. As an alternative, the resilient element can be a torsion spring, a spring subjected to bending stress, like a spiral spring, a leaf spring or a cup spring. Similarly it is conceivable that the resilient element is a compressed air spring, a coiled spring or an elastomer spring.

Another preferred further development of the invention can provide for the device that the movable driving element of the drive unit is at least a gearwheel, which meshes with the gearwheel, which is securely connected to the camera unit or to the protective element, in order to move the camera unit and the protective element. Preferably the drive unit has a gearwheel as the movable driving element. However, it is also possible that there are two or more gearwheels that mesh with each other. Owing to a rotation of at least one gearwheel of the drive unit, the gearwheel, which is securely arranged at either the camera unit or the protective element, is rotated. As a result, the camera unit and the protective element are rotated or more specifically pivoted. That is, the camera unit and the protective element can be moved between their respective end positions by means of the gearwheel of the drive unit and the gearwheel that is attached to the camera unit or to the protective element. In order to move the camera unit and the protective element back and forth between the respective end positions, the gearwheel of the drive unit can be rotated both clockwise as well as counterclockwise. The gearwheel at the camera unit or at the protective element is arranged preferably in close proximity to the rotational axis of the camera unit or the protective element respectively. Particular preference is given to a device, in which the gearwheel at the camera unit is rotatably mounted concentrically about the second axle of the device, or in which the gearwheel at the protective element is rotatably mounted concentrically about the first axle of the device. The axle, about which the gearwheel of the camera unit or the protective element respectively and, with it, the camera unit or the protective element respectively, is rotatably mounted, is designed in a stationary manner Owing to the meshing and the rotation of the gearwheel of the drive unit, the gearwheel of the camera unit that is securely arranged at the camera unit or the gearwheel of the protective element that is securely arranged at the protective element can be rotated, and with the respective gearwheel the camera unit or the protective element respectively can be moved back and forth between the inactive position and the active position or between the closed position and the open position respectively. The gearwheel of the drive unit can be arranged either at a drive shaft of the drive unit or can be operatively connected to an additional gearwheel of the drive unit. An advantageous embodiment of the device can provide that the drive unit has a gear unit, which is operatively connected to the driving element in order to move said driving element. That is, the movable driving element, in particular the gearwheel, can be driven by means of a gear unit of the drive unit. Thus, the drive unit has a motor that drives a drive shaft. The rotational movement of the drive shaft is transferred by the gear unit to the gearwheel of the drive unit that transfers the rotational movement to gearwheel of the camera unit or the protective element respectively. The camera unit and the protective element can be opened or closed as a function of the direction of rotation of the gearwheel of the drive unit that meshes with the gearwheel of the camera unit or the protective element. The gear unit can have a plurality of gearwheels of dissimilar construction.

The drive unit can be configured in a number of different ways. For example, the drive unit can have, as the drive, a motor, such as an electric motor, a hydraulic motor or a pneumatic motor. Other drives, such as magnetic drives, can also be used. Preferably these drives are driven by means of a drive device of the motor vehicle. For example, the drive unit, in particular the motor of the drive unit, of the device can be driven by an internal combustion engine, by a battery, by a fuel cell stack, etc.

An especially preferred further development of the invention can provide for the device that the camera unit has a guide element, which is held guidably in a connecting link guide of the protective element, or that the protective element has a guide element, which is held guidably in a connecting link guide of the camera unit. The camera unit and the protective element can be movably hinged to each other or rather connected together by means of a connecting link guide and a guide element, guided in the connecting link guide. Particular preference is given to arranging the connecting link guide at the protective element and to arranging the guide element at the camera unit. However, the reverse is also possible that the connecting link guide is arranged at the camera unit and that the guide element is arranged at the protective element. By constructing the connection between the protective element and the camera unit in this way it is possible for the device to exhibit an especially compact design. A skillful arrangement of the connecting link guide and the guide element allows the camera unit and the protective element to be arranged approximately parallel to each other. When the camera unit moves relative to the protective element, the guide element moves along the connecting link guide.

Furthermore, preference is given to a device, in which the drive unit is operatively connected to the camera unit or the protective element in such a way that when the protective element is in the closed position and/or the open position, a movement of the protective element owing to the influence of a force, which is exerted manually from the outside, on the protective element is not possible. In particular, the drive unit of the device is designed so as to be self-locking. That is, a movement of the protective element is not possible either in the closed position or in the open position of the protective element. The open position and the closed position of the protective element represent defined stable positions, which are preset by the drive unit. The self-locking design of the drive unit advantageously defines both the open position and the closed position of the protective element.

The inventive device for a motor vehicle with a camera unit exhibits a simple and inexpensive design and guarantees that the camera unit will be well protected against external influences, in particular jolting and bumping, especially when the protective element is in the closed position.

The device according to the invention is arranged at a motor vehicle, in particular at the rear end of a motor vehicle. For example, the device can be arranged in the vehicle frame, in a fairing element, such as a bumper, or in the trunk lid of the motor vehicle. Preferably the device according to the invention is provided in a passenger vehicle or truck. However, it is also conceivable that the device is provided in other motor vehicles, for example in utility vehicles, such as dredgers, cranes, caterpillars, etc.

In the device according to the invention the camera unit is arranged on the vehicle side and can be found in its inactive position in a protective position behind the protective element, which is located correspondingly in its closed position. When the protective element moves into its open position, the camera unit is transferred simultaneously from its inactive position into the active position. In the active position the camera unit can be used for image acquisition. Since both the protective element and the camera unit are moved in a defined way, they cannot collide with each other in the course of an actual movement.

An especially preferred embodiment of the device can provide that the camera unit is arranged at a movably mounted pivot arm, which connects the drive unit to the protective element, so that when the drive unit initiates a movement of the pivot arm, the protective element can be guided into the closed position and into the open position, and the camera unit can be guided into the inactive position and into the active position.

The device is designed in such a way that when a movement of the pivot arm is initiated by the drive unit, the protective element can be moved both from the closed position into the open position and from the open position into the closed position, and the camera unit can be moved both from the inactive position into the active position as well as from the active position into the inactive position.

In this embodiment of the device the camera unit is arranged at a movably mounted pivot arm, which connects the drive unit to the protective element. A movement of the pivot arm that is initiated by the drive unit causes both the protective element and the camera unit to move. Owing to the combined movement of the protective element and the camera unit, the device has a simple design. The drive unit moves only a single pivot arm, in order to guide the protective element from the closed position into the open position and at the same time to guide the camera unit from the inactive position into the active position. Since the camera unit is arranged at the pivot arm and not at the protective element, the camera unit is protected against external influences, such as jolting or bumping.

Since the camera is arranged at the pivot arm, which is operatively connected to the drive unit—that is, which can be moved by means of the drive unit—and since simultaneously the protective element is arranged at the pivot arm, the protective element and the camera unit can be moved simultaneously by means of the movement of the pivot arm.

The pivot arm can be moved only by means of the drive unit, so that this pivot arm cannot be operated by hand. As a result, the protective element, connected to the pivot arm, and the camera unit, arranged at the pivot arm, are held securely in any position. That is, if the pivot arm is not moved by the drive unit, then the protective element and the camera unit remain in a stable position or more specifically remain in a fixed position—that is, in either the closed position or the open position or in either the inactive position or the active position respectively.

The protective element can be either movably mounted on or rigidly arranged at the pivot arm. If, for example, the protective element is rigidly connected to the pivot arm, then the protective element is moved in a translatory manner during a movement of the pivot arm. If the protective element is movably mounted on the pivot arm, then the protective element can be rotated or more specifically pivoted, for example, about an axle during a movement of the pivot arm.

A preferred further development of the invention can provide for the device that the protective element is arranged rotatably and/or pivotably about a first axle, and that the pivot arm with the camera unit is mounted rotatably about a second axle. In this design variant of the device the protective element is connected not only to the pivot arm, but is also arranged rotatably and/or pivotably at a first axle. Thus, the protective element, which can also be referred to as the protective flap, is held securely at the device or more specifically at a vehicle. The first axle is designed, in particular, as a stationary axle. The pivot arm, on which the camera unit sits, is mounted rotatably about a second axle, preferably also a stationary axle. As a result, the pivot arm can be rotated about the second axle by the drive unit. That is, owing to the rotational movement of the pivot arm, the camera unit can be moved back and forth between an inactive position and an active position or correspondingly the protective element can be moved back and forth between a closed position and an open position.

The device is designed advantageously in such a way that the pivot arm is operatively connected to the protective element in such a way that when the protective element is in the closed and/or open position, a movement of the protective element due to the influence of a force, which is exerted manually from the outside, on the protective element is not possible. That is, a movement of the protective element is not possible in both the closed position as well as in the open position of the protective element. The open position and the closed position of the protective element represent defined stable positions, which are preset by the swivel arm and the connection of the protective element at the swivel arm. The type of connection of the protective element at the swivel arm advantageously defines both the open position and the closed position of the protective element.

The drive unit of the device can have, for example, an actuator, by means of which the pivot arm can be moved. For example, the pivot arm can be moved back and forth by a stroke motion, in particular a linear stroke motion, of the actuator, so that said pivot arm can rotate about the second axle. Furthermore, the drive unit can have a motor, in particular an electric motor, or can be designed as a motor, in particular as an electric motor. One advantage of such a drive unit that is designed in this way is that the motor acts in a self-locking manner, so that a manual movement of the protective element, connected to the motor by means of the pivot arm, is not possible. That is, if, for example, the protective element is pulled, the self-locking motor prevents the protective element and, with it, the camera unit from moving. Thus, a self-locking motor represents effective protection against theft.

A preferred embodiment of the device provides that the drive unit has a crank, which is mounted rotatably about a third axle; that the crank has a guide element, which runs parallel to the third axle and can be guided circularly around the third axle during a rotational movement of the crank; and that the guide element for moving the pivot arm is operatively connected to the pivot arm. Owing to such a design of the device the pivot arm can be moved reliably and uniformly. The drive unit can rotate the crank optionally clockwise or counterclockwise. The crank has a guide element, which is arranged on the crank at a distance from the rotational axis of the third axle, so that the guide element can be moved circularly about the rotational axis of the third axle during a rotational movement of the crank. The guide element is operatively connected to the pivot arm in order to move the pivot arm. That is, during a circular or at least partially circular movement of the guide element, the pivot arm can be rotated about the second axle.

Another preferred further development of the invention can provide for the device that the end of the pivot arm facing the drive unit has a connecting link guide for moving the pivot arm by means of the drive unit, in particular for guiding the guide element of the crank. Owing to such a design of the pivot arm the guide element, provided at the crank of the drive unit, can move the pivot arm during a rotation of the crank or can rotate the pivot arm about the second axle when the guide element engages with the connecting link guide of this pivot arm. The connecting link guide is preferably a recess, in particular in the form of a groove, in the end of the pivot arm facing the drive unit. In this case the length of the connecting link guide is adapted to the rotational movement of the crank or more specifically the guide element. The guide element of the crank is guidably or displaceably mounted in a positive locking manner or rather in an approximately positive locking manner in the connecting link guide of the pivot arm. Preferably the guide element of the crank is designed as a cam or as a sliding block.

The protective element is also arranged preferably in a movable manner at the pivot arm. Particular preference is given to a device, in which the end of the pivot arm that faces the protective element has a guide element, which is held guidably in a connecting link guide of the protective element. That is, during a movement, in particular, a rotational movement, of the pivot arm, the guide element, arranged at the pivot arm, slides along the connecting link guide of the protective element, so that the protective element is moved, in particular, rotated. The guide element of the pivot arm is preferably designed as an element, projecting from the pivot arm, in particular as a cam or a sliding block. In this case the longitudinal axis of the guide element of the pivot arm runs preferably parallel to the second and the first axle of the device.

In particular, the device is designed in such a way that when the protective element is in the closed position, the guide element of the pivot arm strikes against that end of the connecting link guide of the protective element that faces away from the first axle, and that when the protective element is in the open position, the guide element of the pivot arm strikes against that end of the connecting link guide of the protective element that faces the first axle. As a result of this feature, the position of the closed position of the protective element and the position of the open position of the protective element are preset in a defined way. Thus, the ends of the connecting link guide form in each case an end stop for the guide element of the pivot arm and, thereby, limit both the movement, in particular the rotation, of the pivot arm and that of the protective element.

A preferred further development of the invention can provide for the device that the connecting link guide of the protective element or the camera unit is configured so as to be linear and/or curved. Another preferred further development of the invention can provide for the device that the connecting link guide of the pivot arm is configured so as to be linear and/or curved and/or that the connecting link guide of the protective element is configured so as to be linear and/or curved. Preferably the connecting link guide of the pivot arm and the connecting link guide of the protective element are then configured so as to be linear, when the pivot arm is mounted rotatably about an axle—that is, the second axle. Furthermore, it is preferred that the connecting link guide of the protective element is configured so as to be linear, and the longitudinal axis of connecting link guide of the protective element points towards or approximately towards the first axle. This feature guarantees that the guide element of the pivot arm slides optimally in the connecting link guide of the protective element and does not catch during the movement of the pivot arm and the protective element.

The guide element of the pivot arm is arranged at the end of the pivot arm that faces the protective element. Since the camera unit is arranged preferably on the face side of this end of the pivot arm, the guide element is provided preferably on the side of this end of the pivot arm. The camera unit is arranged at the end of the pivot arm that faces the protective element, in particular by means of a friction locking connection. Therefore, the camera unit forms advantageously the face sided closure of the part of the pivot arm that faces the protective element.

Another preferred further development of the invention can provide for the device that the guide element of the crank is arranged rotatably at the crank and/or that the guide element at the end of the pivot arm that faces the protective element is arranged rotatably at the pivot arm. This feature guarantees that the guide element of the pivot arm and the guide element of the crank can slide along the corresponding connecting link guides with a very high degree of certainty.

The pivot arm of the device can be designed in a variety of ways. Preferably the pivot arm is designed in an angle-shaped form. In this context the pivot arm can be made in one piece or multiple pieces, in particular in two pieces. In the case of a multi-part design of the pivot arm, the different parts of the pivot arm are connected securely to each other when the device is running. The advantage of a two-part or multi-part design of the pivot arm lies in the fact that the individual parts are easier and less expensive to replace than a pivot arm that is made in one piece. The pivot arm or more specifically the individual parts of the pivot arm are made preferably of a synthetic plastic material or metal, in particular a lightweight metal. A pivot arm made in one piece has a hole, in particular in the middle or rather in the area of the middle of the pivot arm, by means of which the pivot arm is rotatably mounted at the second axle of the device. If the pivot arm is designed, for example, as two parts, then each part or more specifically each limb of the pivot arm has a hole, which serves to mount the two parts on the second axle.

Preferably the protective element of the device is designed as an emblem, or rather preferably the protective element of the device has an emblem. An emblem in the context of the invention is, in particular, a distinguishing mark for the make of a motor vehicle, in particular the make of car. In this case the emblem can be a two-dimensional or three-dimensional design.

The first axle and the second axle of the device are arranged preferably in an immovable manner. In this case the first axle and the second axle can be arranged at the motor vehicle, in particular at a part of the vehicle body, at a bumper or at the trunk lid of the motor vehicle. Another preferred further development of the invention can provide for the device that the first axle and the second axle are arranged at a housing element of the device. The housing element of the device is designed preferably in such a way that said housing element can be arranged at a motor vehicle, in particular at a part of the vehicle body, at a bumper or at a trunk lid of a motor vehicle. In this case the housing element forms a protective chamber for at least one part of the device, and this protective chamber has an opening that can be covered by the protective element. That is, when the closing element is in the closed position, this closing element totally covers the opening, so that the device, in particular the pivot arm, the camera unit and the drive unit are protected. The drive unit can be arranged outside the housing element, inside the motor vehicle. In this case the housing element has a recess, in particular, a guide slot, through which the pivot arm of the device can be guided.

It is preferred that the protective element in its closed position covers the opening of the housing element of the device and that the camera unit in the active position is guided through the opening of the housing element of the device.

A second aspect of the invention provides means of a motor vehicle with a camera unit, wherein the motor vehicle has at least one device, according to the first aspect of the invention. The camera unit is arranged movably in the device. Preferably the motor vehicle is designed as a truck or a passenger vehicle. Furthermore, the motor vehicle can be a boat or a ship. Similarly it is conceivable that the motor vehicle is designed as a utility vehicle, such as a dredger, a caterpillar, a crane, etc. It is especially advantageous for the motor vehicle to have two or more such devices. In this case several devices can be coupled together in such a way that they can be operated in parallel to each other. In particular, it can be provided that a drive unit moves several pivot arms with suitably arranged camera units.

BRIEF DESCRIPTION OF THE DRAWINGS

Additional advantages, features and details of the present invention are apparent from the following description, in which exemplary embodiments of the present invention are described in detail with reference to the accompanying drawings. The features mentioned in the claims and in the description may be essential to the invention either individually or in any combination. Referring to the drawings:

FIG. 8 is a side view of the device according to FIG. 6, wherein the camera unit can be found in the active position and the protective element can be found in the open position.

DETAILED DESCRIPTION

Figure 1:
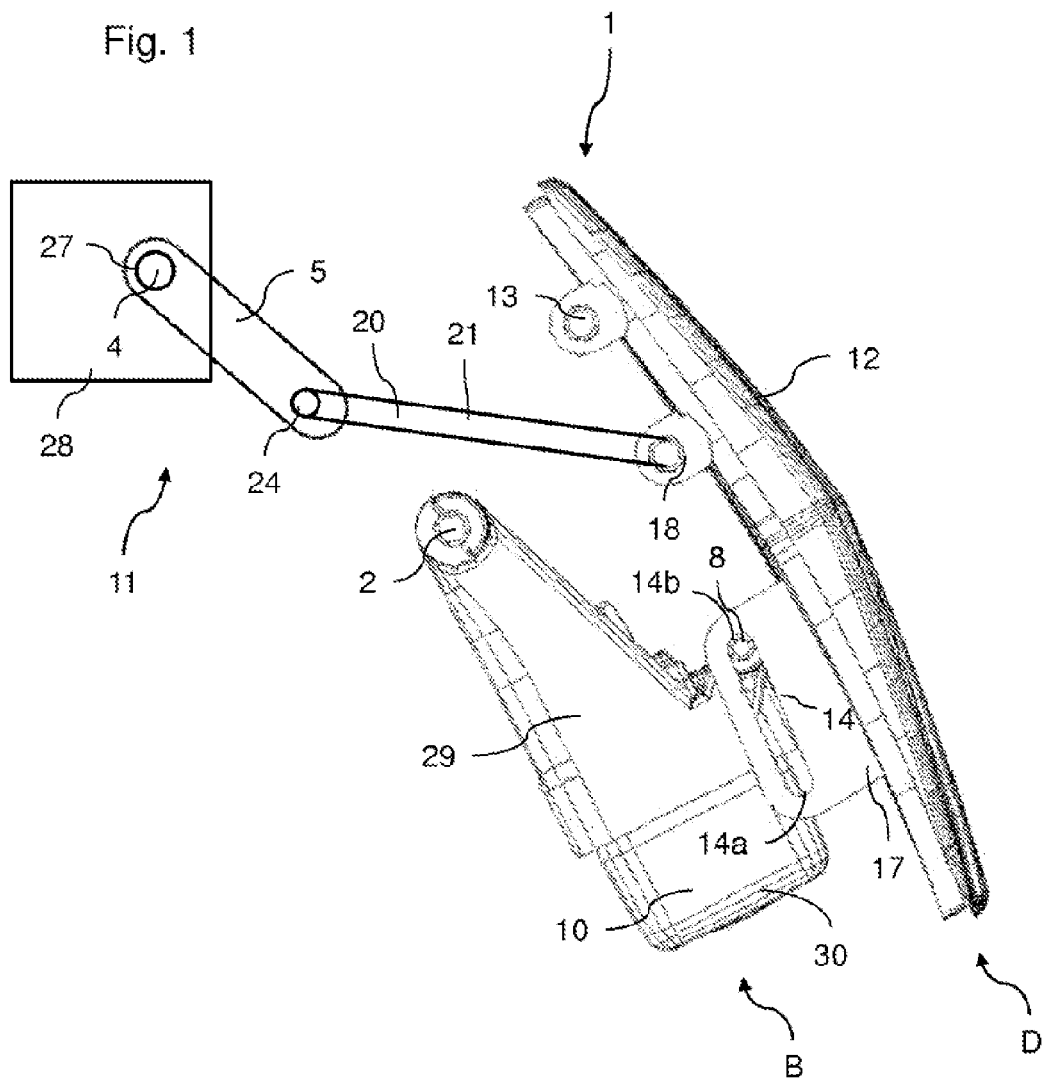
FIG. 1 is a side view of a first design variant of the device that is intended for a motor vehicle and that comprises a camera unit, which is configured according to the design principle of the invention, wherein the camera unit can be found in the active position and the protective element can be found in the open position.

Elements having an identical function and operating mode are provided with the same reference numerals and symbols in the FIGS. 1 to 8.

FIG. 1 is a side view of a first possible design variant of the device 1 that is intended for a motor vehicle and that comprises a camera unit 10, in particular a movably mounted camera unit 10, which is configured according to the design principle of the invention. The device 1 is characterized by the fact that the camera unit 10 and the protective element 12 are movably hinged together. As a result of this feature, the camera unit 10 follows the protective element 12, when said protective element is moved by means of the drive unit 11. The protective element 12 is mounted rotatably and/or pivotably about a first axle 13. The first axle 13 is securely arranged at the device 1 or at the motor vehicle, at which the device 1 is arranged. The camera unit 10 is mounted rotatably about a second axle 2. The camera unit 10 of the device can have a camera housing 29 with an end that is mounted rotatably at the second axle 2. The camera objective 30 sits on the other end of said camera housing. The drive unit 11 has a motor 28 and a gear unit 27. The motor 28 transfers a torque to the third axle 4, which is designed, in particular, as the drive shaft. The third axle 4 or more specifically the drive shaft 4 passes the rotational movement to the gear unit 27, which in this design variant of the device 1 has a crank 5. A movable driving element 20, here in the form of a drive rod 21, is hinged via a joint 24 to the end of the crank 5 that faces away from the drive shaft 4. The other end of the movable driving element 20—that is, the drive rod 21—is fastened in a rotationally movable manner to the protective element 12 by means of the linking mechanism 18. When the crank 5 of the drive unit 11 rotates, the drive rod 21 is moved. Owing to the movement of the drive rod 21 the protective element 12 can be moved back and forth between the closed position and the open position C. Since the camera unit 10 and the protective element 12 are movably hinged together, the camera unit 10 can be moved concomitantly at the same time with the movement of the protective element 12, when the protective element 12 is pivoted about the first axle 13. The drive rod 21 of the drive unit 11 is connected in a rotationally movable manner to the protective element 12 by way of the linking mechanism 18, so that said linking mechanism can push the protective element 12 out into the open position D and can pull said protective element into the closed position. The articulated connection between the camera unit 10 and the protective element 12 is produced by a connecting link guide 14 at the protective element 12 and a guide element 8 at the camera unit 10, so that the guide element 8 can slide along the connecting link guide 14. The guide element 8 of the camera unit 10 is operatively connected to the protective element 12. That is, the guide element 8 of the camera unit 10 can be mounted guidably in the connecting link guide 14 of the protective element 12. When the protective element 12 moves, the guide element 8 slides along the connecting link guide 14 of the protective element 12 and is limited only by the end stops 14a, 14b.

In a design variant (not illustrated) of the device 1 the drive rod 21 of the drive unit 11 can be hinged to the camera unit 10, instead of the protective element 12. In this case the camera unit 10 and not the protective element 12 is moved directly or indirectly by the drive unit 11 and then passes the movement on to the protective element 12.

Figure 2:
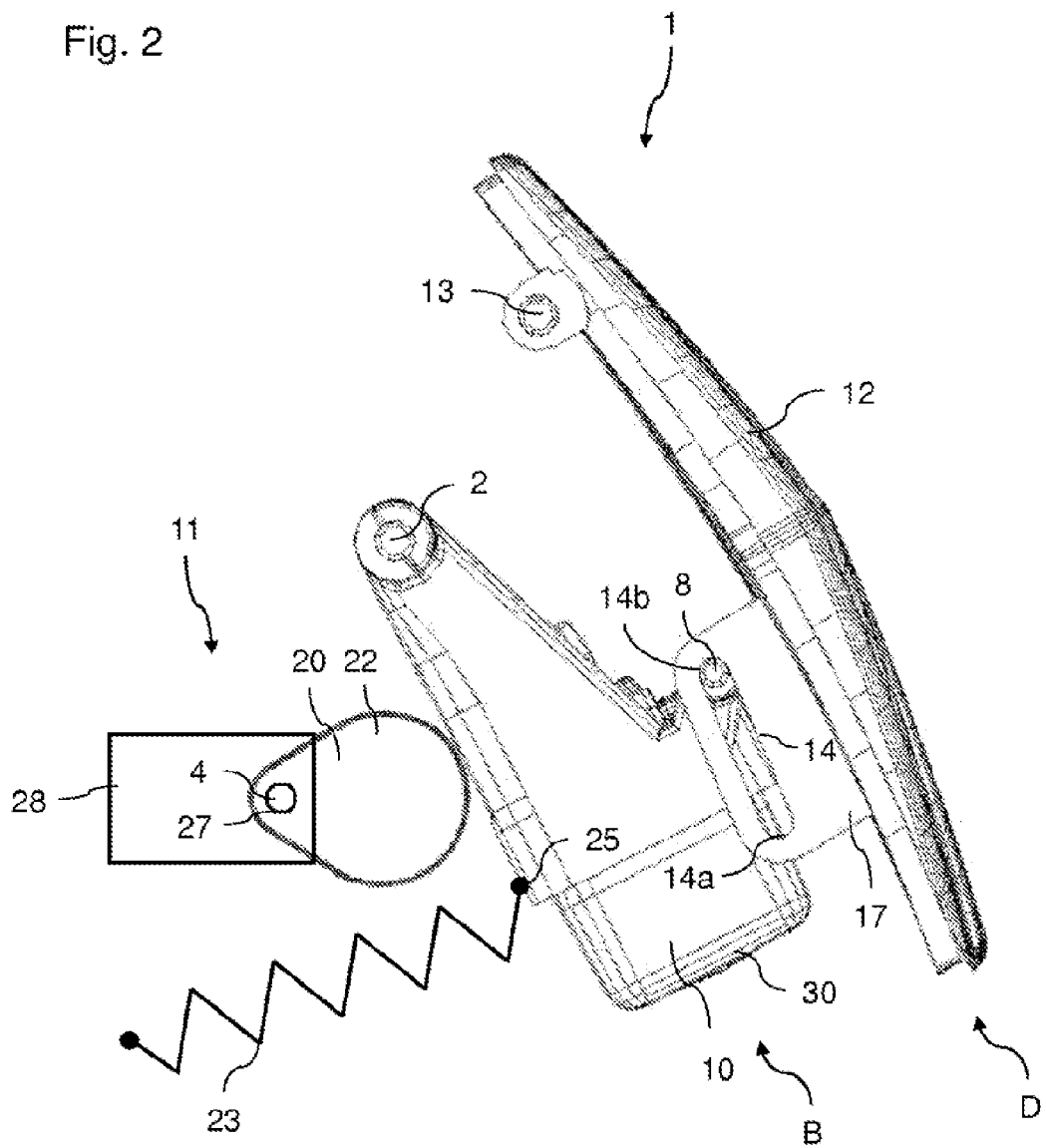
FIG. 2 is a side view of a second design variant of the device that is intended for a motor vehicle and that comprises a camera unit, which is configured according to the design principle of the invention, wherein the camera unit can be found in the active position and the protective element can be found in the open position.

FIG. 2 is a side view of a second design variant of the device 1 that is intended for a motor vehicle and that comprises a camera unit 10, in particular a movably mounted camera unit 10, which is configured according to the design principle of the invention. In this design variant of the device 1 for a motor vehicle the drive unit 11 has a cam 22. The cam 22 is arranged eccentrically about the third axle 4, which is designed, in particular, as a drive shaft. When the motor 28 initiates a rotational movement of the drive unit 11, the drive shaft 4 transfers a rotational movement to the cam 22. The camera unit 10 is loaded with a spring force that is exerted by the resilient element 23. At the same time the resilient element 23 pulls the camera unit 10 against the cam 22, in particular against the circumferential edge of the cam 22, so that the camera unit 10 rests permanently against the cam 22. As a result, the camera unit 10 follows the movement of the cam 22. In this case the cam 22 is operatively connected to the camera unit 10 in such a way that the eccentric movement of said cam allows the cam to move the camera unit 10 back and forth between the inactive position A and the active position B. At the same time the protective element 12 is moved back and forth between the closed position C and the open position D. The resilient element 23 can be arranged in different ways in or at the device 1. For example, the resilient element 23 can be fastened to the camera unit 10, as shown in FIG. 2, but also to the protective element 12. The attachment of the resilient element 23 to the camera unit 10 is shown by the reference numeral 25. As an alternative to the cam 22, an eccentrically mounted disk can be provided. The resilient element 23 can be designed as a compression spring or as a tension spring. The resilient element 23 can be, for example, a helical spring. As an alternative, the resilient element 23 can be a torsion spring, a spring subjected to bending stress, such as a spiral spring, a leaf spring or a cup spring. Similarly the resilient element 23 can be a compressed air spring, a coiled spring or an elastomer spring.

Figure 3:
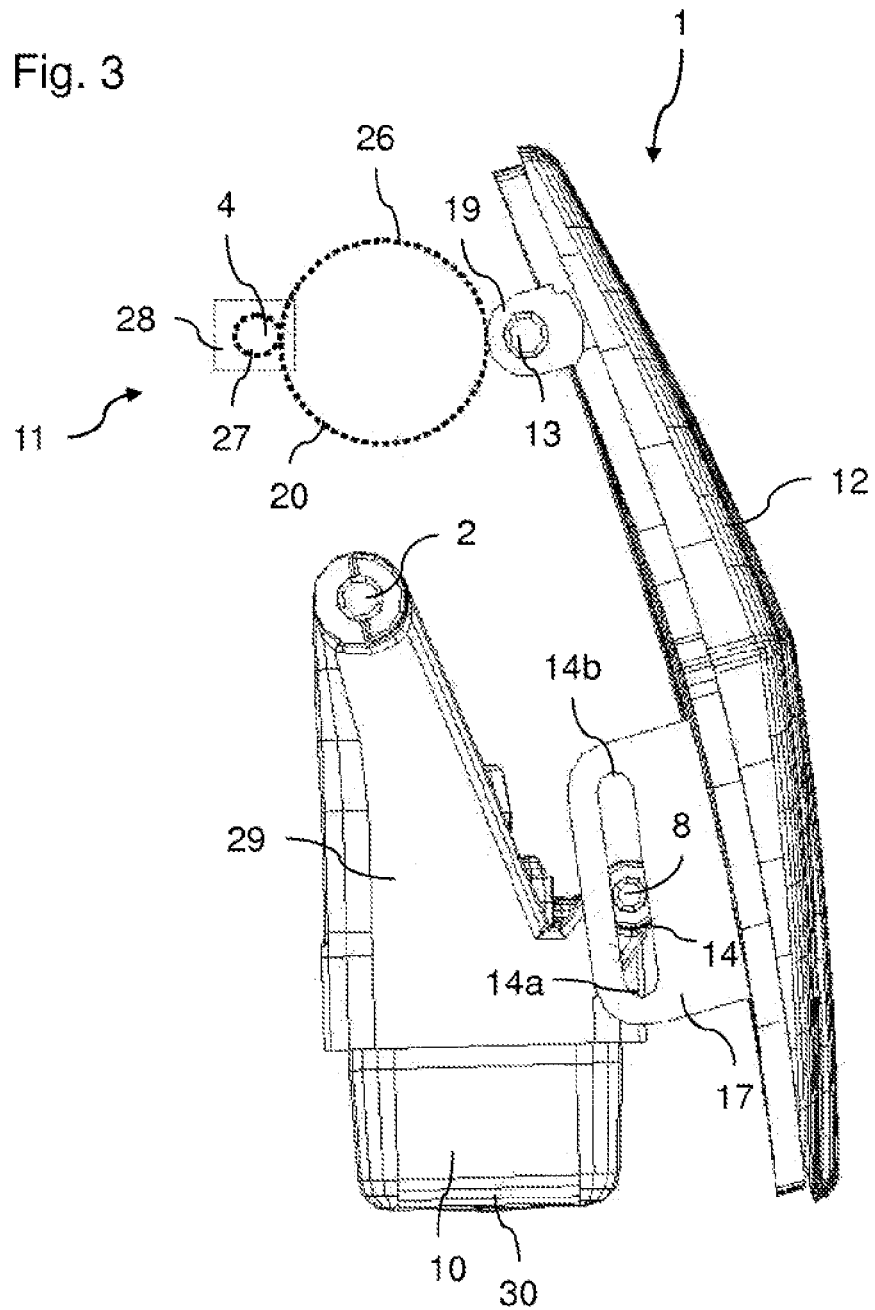
FIG. 3 is a side view of a third design variant of the device that is intended for a motor vehicle and that comprises a camera unit, which is configured according to the design principle of the invention, wherein the camera unit can be found between the inactive position and the active position and the protective element can be found between the closed position and the open position.

FIG. 3 is a side view of a third embodiment of the device 1 that is intended for a motor vehicle, which is configured according to the design principle of the invention. In this design variant of the device 1, the protective element 12 is moved by a gearwheel 26 of the drive unit 11. That is, in this design variant of the device 1 the movable driving element 20 is a gearwheel 21, which is driven by a gear unit 27 of the drive unit 11. The gear unit 27 passes the rotational movement, which is introduced into the third axle 4—that is, the drive shaft—by the motor 28, on to the gearwheel 26. The gearwheel 26 meshes with a gearwheel 19 of the protective element 12. The gearwheel 19 of the protective element 12 is securely connected to the protective element 12. In this context it is advantageous that the gearwheel 19 is rotatably mounted concentrically about the first axle 13. As a result of this feature, the protective element 12 can be rotated about the first axle 13, when the gearwheel 19, which is securely arranged at the protective element 12, is rotated by the gearwheel 26 of the drive unit 11. Depending on whether the gearwheel 26 of the drive unit 11 is rotated clockwise or counterclockwise, the protective element 12 is opened or closed.

Figure 4:
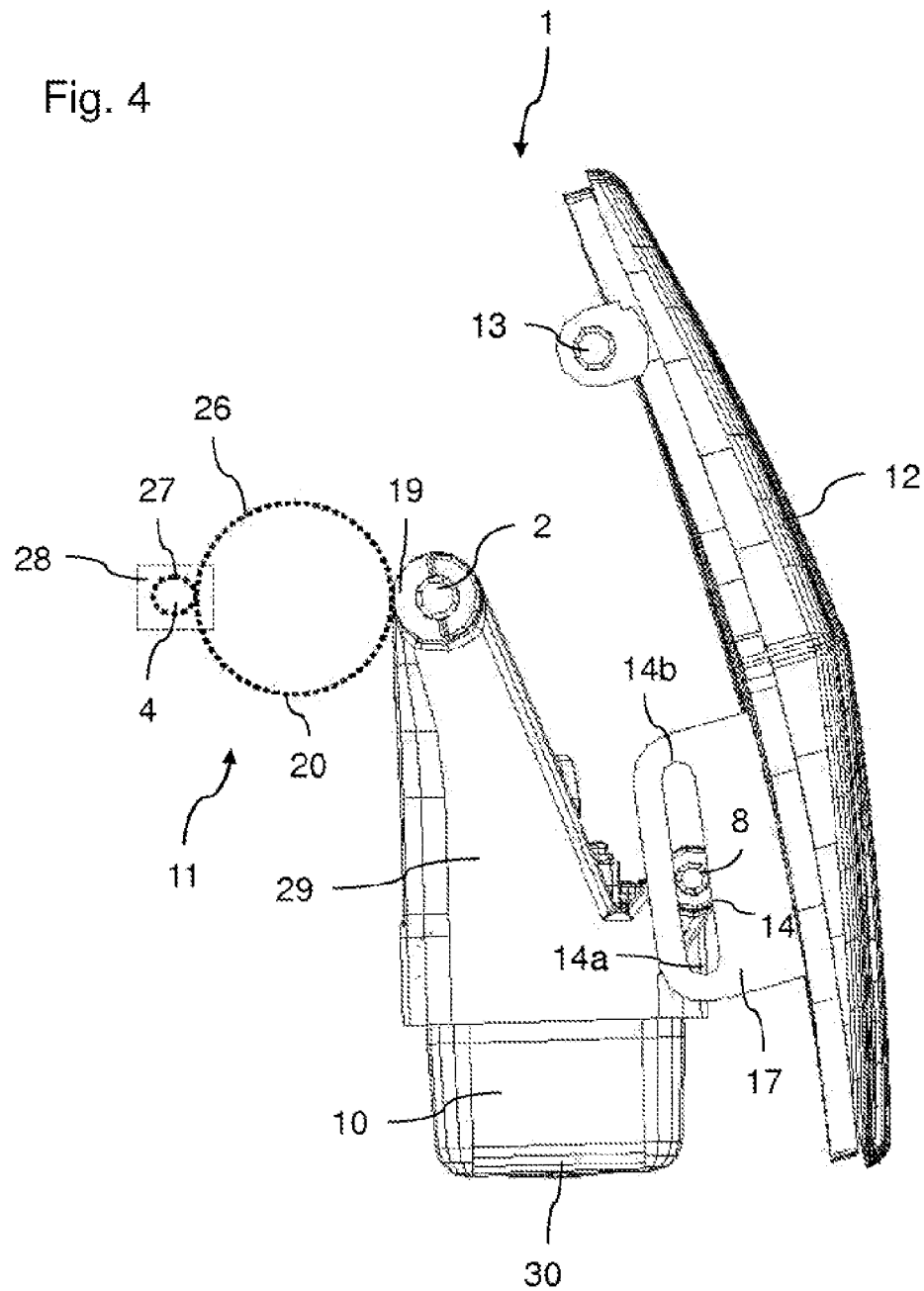
FIG. 4 is a side view of a fourth design variant of the device that is intended for a motor vehicle and that comprises a camera unit, which is configured according to the design principle of the invention, wherein the camera unit can be found between the inactive position and the active position and the protective element can be found between the closed position and the open position.

As an alternative to the design variant of the device 1, wherein the gearwheel 26 of the drive unit 11 meshes with a gearwheel 19 of the protective element 12, in order to move said protective element, the gearwheel 26 of the drive unit 11 can mesh with the gearwheel 19 at the camera unit 10, as shown in FIG. 4. The gearwheel 19 of the camera unit 10 is rotatably mounted concentrically about the second axle 2. As a result of this feature, the camera unit 10 can be rotated due to a rotation of the gearwheel 19 about the second axle 2. In FIG. 4 the camera unit 10 can be found between the inactive position A and the active position B, and correspondingly the protective element 12 can be found between the closed position C and the open position D. The movable driving element 20—that is, the gearwheel 26—of the drive unit 11 meshes with the gearwheel 19 of the camera unit 10. The camera unit 10 and, with it, the protective element 12 can be opened or closed as a function of the direction of rotation of the motor 28 or more specifically the drive shaft 4.

Figure 5:
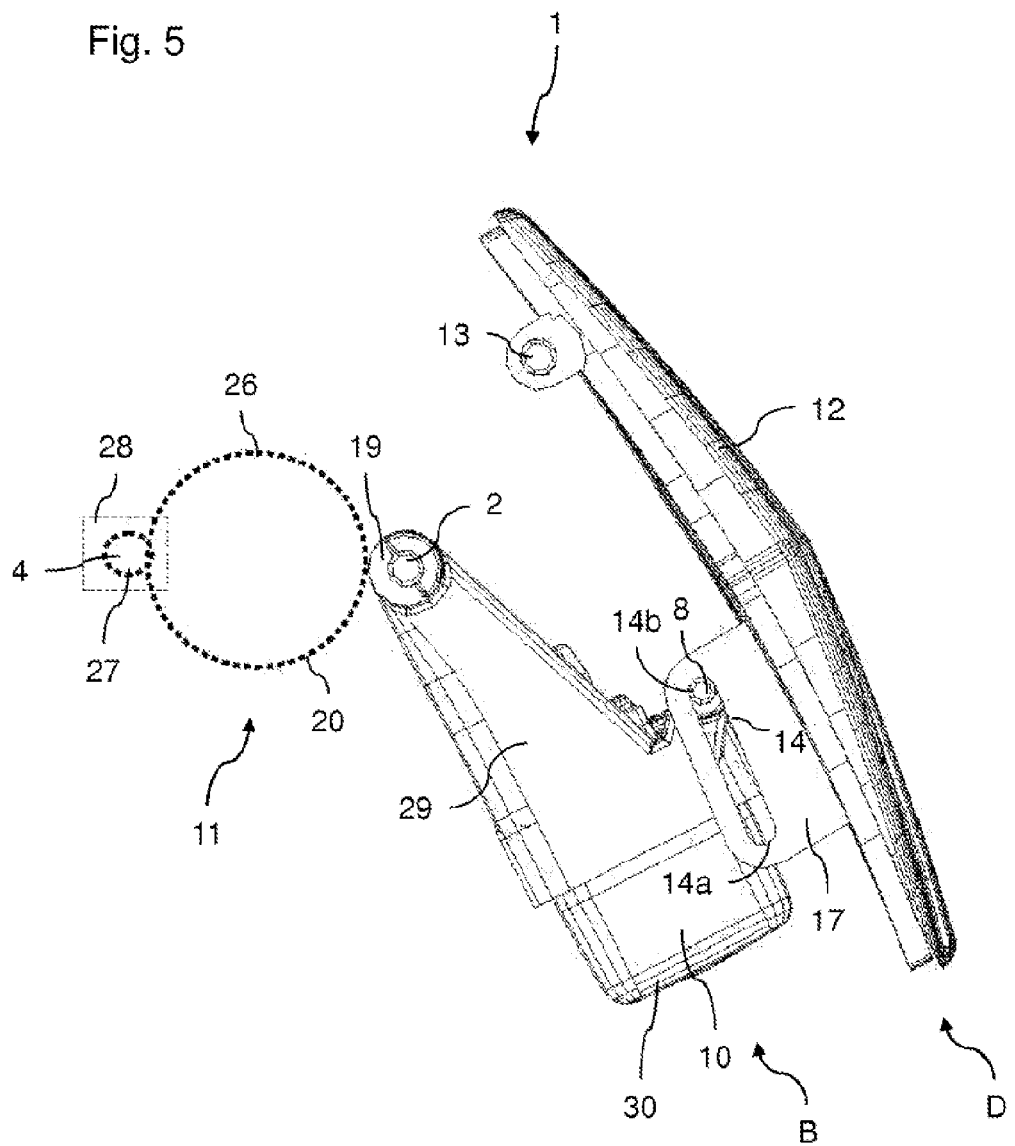
FIG. 5 is a side view of the fourth design variant of the device for a motor vehicle according to FIG. 4, wherein the camera unit can be found in the active position and the protective element can be found in the open position.

FIG. 5 shows the design variant of the device 1 from FIG. 4 in the open position. That is, the camera unit 10 can be found in the active position B, in which it can detect the surrounding area of the vehicle. The objective 30 of the camera unit 10 has been pivoted in the direction of the surrounding area of the vehicle. The protective element 12 can be found in the open position D. In this position an additional pivoting motion of the camera unit 10 and the protective element 12 is suppressed by the connection between the camera unit 10 and the protective element 12. The guide element 8, which is designed as a cam, a bolt or a sliding block and which is part of the camera unit 10, strikes against that end 14b of the connecting link guide 14 of the protective element 12 that faces the first axle 13. The end stop defines the position or more specifically the one end position of the protective element 12 and the camera unit 10. Inversely, the closed position of the camera unit 10 and the protective element 12 is defined by that end 14a of the connecting link guide 14 that faces away from the first axle 13. The end 14a of the connecting link guide 14 that faces away from the first axle 13 forms a second end stop.

The connecting link guide 14 of the protective element 12 is arranged in a projection 17 of the protective element 12. The connecting link guide 14 is designed in a linear manner. It is also conceivable that the connecting link guide 14 exhibits an at least partially curved form.

Figure 6:
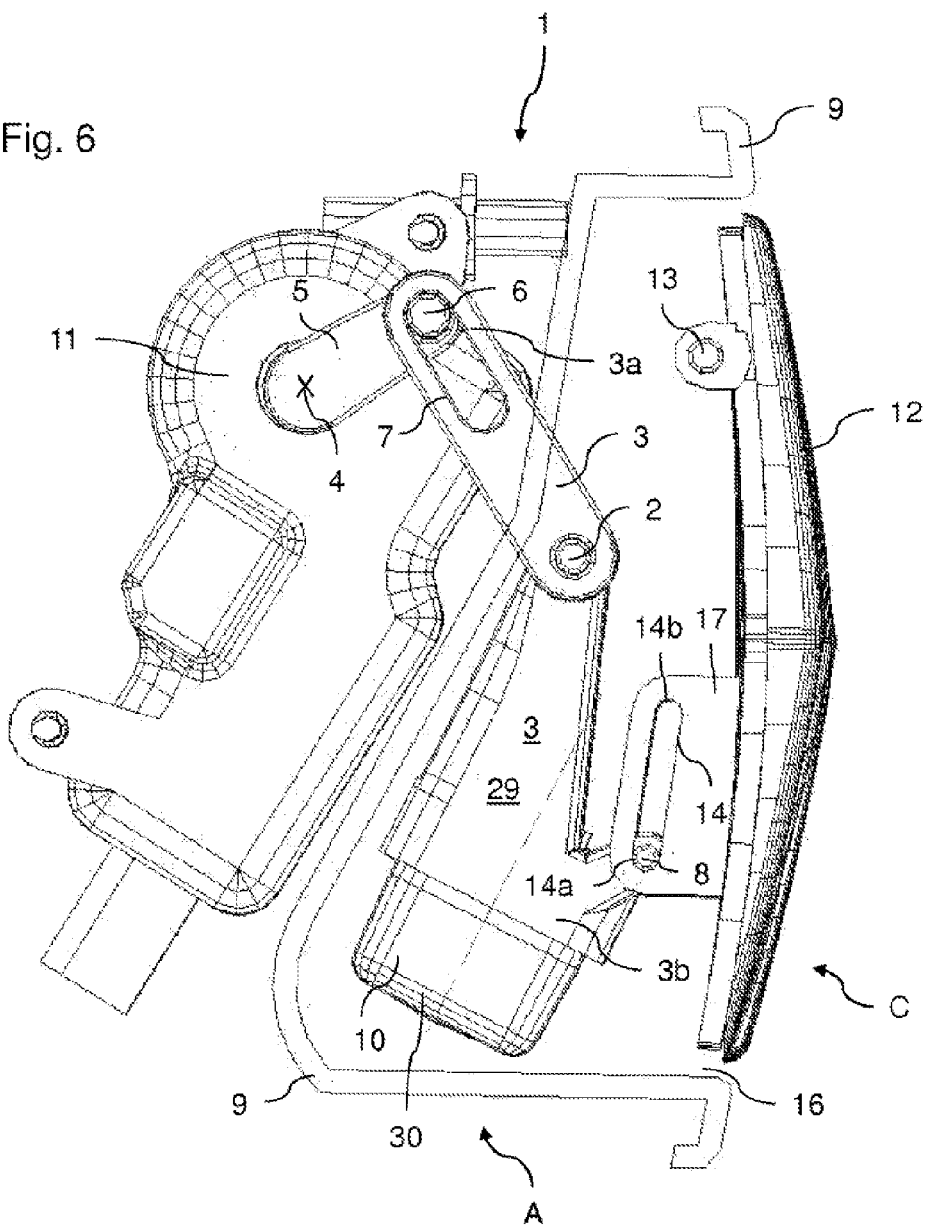
FIG. 6 is a side view of a fifth design variant of the device that is intended for a motor vehicle and that comprises a movably mounted camera unit, which is configured according to the design principle of the invention, wherein the camera unit can be found in the inactive position and the protective element can be found in the closed position.

FIG. 6 is a side view of a fifth design variant of the device 1 that is intended for a motor vehicle and that comprises a movably mounted camera unit 10, which is configured according to the design principle of the invention, wherein the camera unit 10 can be found in the inactive position A and the protective element 12 can be found in the closed position C. The device 1 has a drive unit 11, which is operatively connected to a pivot arm 3 of the device 1. The pivot arm 3 connects the drive unit 11 to the protective element 12. In this design variant of the device 1 the pivot arm 3 is made in two pieces, where both parts of the pivot arm 3 are securely connected together. The pivot arm 3 is designed in an angle-shaped form and is mounted rotatably about a second axle 2 of the device 1. The end of the pivot arm 3—the so-called first end 3a of the pivot arm 3—which faces the drive unit 11, has a connecting link guide 7 in the form of an oblong recess, in particular an oblong groove. The drive unit 11 has a crank 5, which is mounted rotatably about a third axle 4. The free end of said crank 5 has a guide element 6. The guide element 6 of the crank 5 is designed, in particular, as a cam or as a sliding block that projects from the crank 5. At the same time the crank 5 and the guide element 6 respectively of the drive unit 11 are connected to the pivot arm 3 in such a way that the guide element 6 can slide in the connecting link guide 7 of the pivot arm 3, so that when the crank 5 and, with it, the guide element 6 move, the pivot arm 3 can be rotated about the second axle 2. The end of the pivot arm 3—that is, the so-called second end 3b of the pivot arm 3—which faces the protective element 12, has the camera unit 10. In this fifth design variant the camera unit 10 is arranged on the face side of the second end 3b of the pivot arm 3. On the side of the second end 3b of the pivot arm 3 the pivot arm 3 has a guide element 8, which is designed, in particular, as a cam or a sliding block. This guide element 8 of the pivot arm 3 is operatively connected to the protective element 12. That is, the guide element 8 is mounted guidably in a connecting link guide 14 of the protective element 12. When the pivot arm 3 moves, the guide element 8 slides in the connecting link guide 14 of the protective element 12. The protective element 12 forms the closure of the device 1. That is, when the protective element 12 is in the closed position shown in FIG. 6, the protective element 12 completely covers the rest of the parts of the device 1, so that these parts are well protected against external influences, such as jolting and bumping. The device 1 has advantageously a housing element 9, in which at least parts of the device 1 are arranged. This arrangement protects these parts, in particular the pivot arm 3 and the camera unit 10. In order to be able to move the camera unit 10 into an active position, the housing element 9 has an opening 16. In the closed position the protective element 12 totally covers the opening 16, so that the camera unit 10 and the rest of the components of the device 1 are protected.

In the closed position of the protective element 12 the guide element 8 of the pivot arm 3 strikes against that end 14a of the connecting link guide 14 of the protective element 12 that faces away from the first axle 13. As a result, the closed position of the protective element 12 is preset in a defined way. An additional movement, in particular a rotation, of the protective element 12 is prevented at that end 14a of the connecting link guide 14 that faces away from the first axle 13 by means of the end stop of the guide element 8 of the pivot arm 3. The protective element 12 is mounted rotatably about the first axle 13. The connecting link guide 14 of the protective element 12 is provided preferably at a projection 17 of the protective element 12. This projection 17 extends in the direction of the pivot arm 3 of the device 1.

Figure 7:
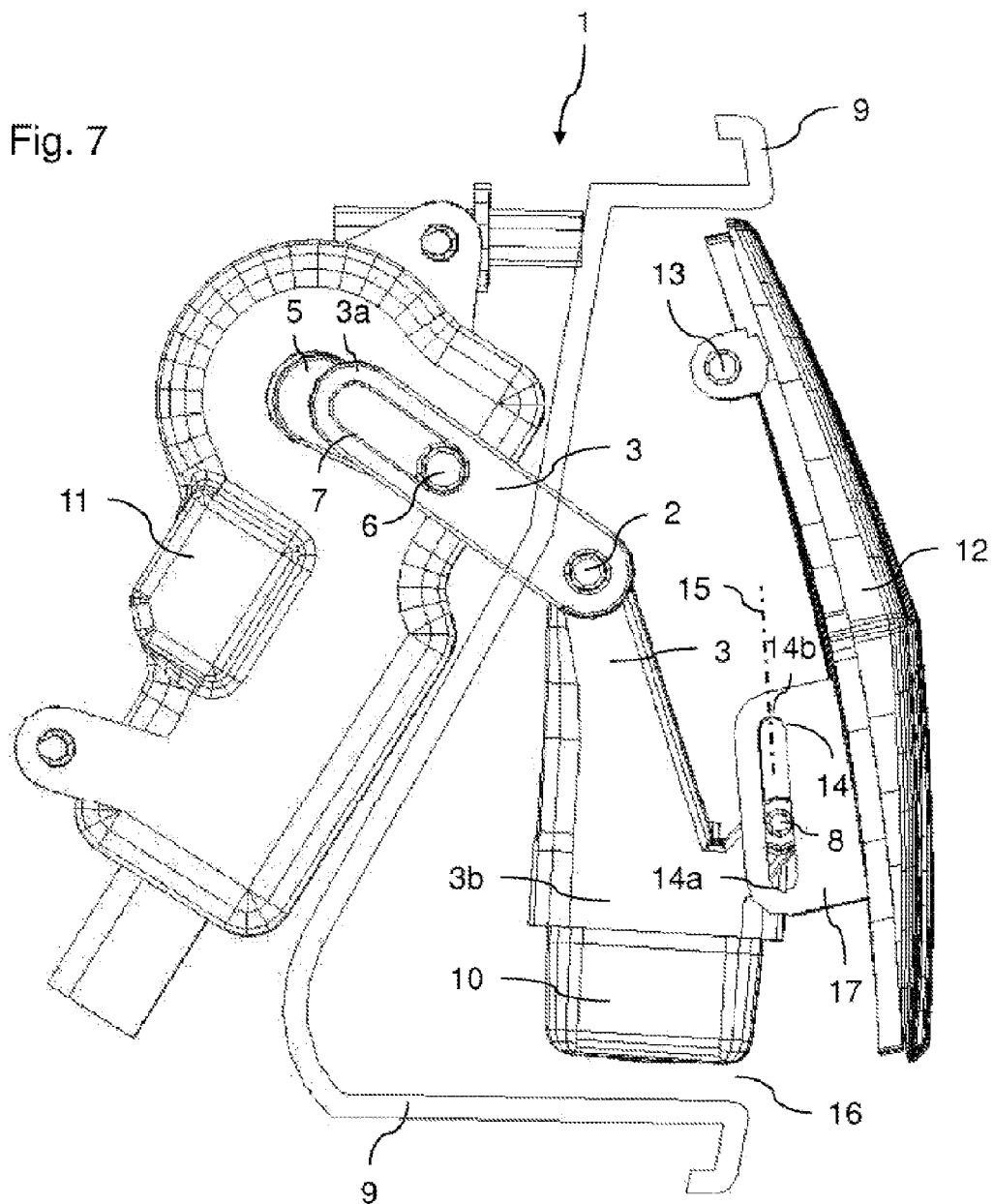
FIG. 7 is a side view of the device, according to FIG. 6, during the movement of the camera unit and the protective element.

FIG. 7 shows the same design variant of the device according to FIG. 6, wherein the camera unit 10 can be found in a position between the inactive position A, as shown in FIG. 6, and the active position B, as shown in FIG. 8. The same applies to the protective element 12. In FIG. 7 this protective element can be found between the closed position, as shown in FIG. 6, and the open position, as shown in FIG. 8. The guide element 6 of the crank 5 of the drive unit 11 has slid along the connecting link guide 7 of the pivot arm 3 in the direction of the second axle 2. The pivot arm 3 is rotated about the second axle 2 due to the movement of the guide element 6 of the crank 5, so that the guide element 8 of the pivot arm 3 of the protective element 12 moves, in particular rotates about the first axle 13. At the same time the guide element 8 of the pivot arm 3, which is designed, in particular, as a cam or as a sliding block, slides in the connecting link guide 14 of the protective element 12, so that this protective element is moved. In this case the longitudinal axis 15 of the connecting link guide 14 of the protective element 12 is designed, in particular, in such a way that it points towards the first axle 13. Such a design of the protective element 12 and the pivot arm 3 respectively of the device 1 guarantees that the guide element 6 of the crank 5 and the guide element 8 of the pivot arm 3 can slide optimally along the respective connecting link guides 7 and 14 respectively.

FIG. 8 is an additional side view of the device according to FIG. 6, wherein the camera unit 10 can be found in the active position B and the protective element 12 can be found in the open position. The camera unit 10 is pivoted so far that it is guided through the opening 16—that is, is guided into an active position B. In this active position B the camera unit 10 can be used for image acquisition. The guide element 8 of the pivot arm 3 has slid along the connecting link guide 14 of the protective element 12 until an additional movement of the protective element 12 has been limited by the guide element 8 striking against the end 14b of the connecting link guide 14 that faces the first axle 13. That is, the connecting link guide 14, in particular the end 14b of the connecting link guide 14 that serves as a stop, limits a further rotation of the protective element 12 about the first axle 13. The special design and arrangement of the connecting link guide 14 of the protective element 12 as well as the rotational motion of the pivot axle 13 about the second axle 2 provides that the protective element 12 in the open position occupies a safe and stable position. In this position of the device 1 the guide element 6 of the crank 5 strikes against that end of the connecting link guide 7 of the pivot arm 3 that faces away from the second axle 2. The crank 5 of the drive unit 11 remains in the open position of the protective element 12, in which the camera unit 10 can be found in the active position. If the crank 5 of the drive unit 11 is rotated back counterclockwise, the pivot arm 3 rotates clockwise, so that as a result, the protective element 12 can be returned from the open position into a closed position, as shown in FIG. 6, and at the same time the camera unit 10 can be returned from the active position B into the inactive position A, as also shown in FIG. 6.

In the five different design variants the drive unit 11 has advantageously a motor. Preferably the drive unit 11 can have an actuator, by means of which the camera unit 10 and the protective element 12 can be moved. The motor can be operated, for example, electrically, pneumatically, hydraulically or magnetically. The camera unit 10 has advantageously a camera housing 29 and an objective 30. The camera housing 30 can be a part of the pivot arm 3, as shown in the FIGS. 6 to 8.

The advantage of the device for a motor vehicle with a movably mounted camera unit is that this device requires fewer structural components as compared to the devices known from the prior art. Since the camera unit and the protective element are movably hinged together, the device is easy and inexpensive to make. Only a single drive unit is necessary in order to move both the camera unit and the protective element. In this case it is irrelevant whether the drive unit is operatively connected directly or indirectly to the camera unit or to the protective element. Since the camera unit and the protective element are connected together in a movable manner, both the camera unit and the protective element can always be moved relative to each other when one of the elements is moved. Thus, the special arrangement of the pivot arm, which connects the drive unit and the protective element to each other, and the camera unit at the pivot arm enables the camera unit to be moved out at the same time that the protective element is opened or enables the camera unit to be retracted at the same time that the protective element is closed. In order to move the camera unit and the protective element, only one single pivot arm is provided, and this pivot arm is moved by a drive unit. The special design and arrangement of the guide element of the pivot arm and the connecting link guide of the protective element ensure that the device and, in particular, the camera unit are arranged so that they are well protected against theft.

Both in the retracted position of the camera unit as well as in the extended position of the camera unit, a stable position of the camera unit and/or the protective element is provided. In the retracted position of the camera unit—that is, in the inactive position of the camera unit—the closed protective element cannot be moved manually from the outside, so that effective protective against theft of the camera unit is guaranteed.

The invention claimed is:

1. Device that is intended for a motor vehicle and that has a camera unit, which can be brought into an inactive position and into an active position, and has a protective element, which can be guided into a closed position and into an open position, wherein
in the closed position of the protective element the camera unit is in its inactive position behind the protective element, where it is inaccessible from the outside, and in the open position of the protective element the camera unit is in its active position for image acquisition, and the device has a drive unit for moving the camera unit and the protective element, wherein
the camera unit and the protective element are movably hinged to each other.

2. Device, as claimed in claim 1,
wherein
the drive unit is operatively connected to the protective element in such a way that when the protective element moves between the closed position and the open position, the camera unit moves simultaneously relative to the protective element, or the drive unit is operatively connected to the camera unit in such a way that when the camera unit moves between the inactive position and the active position, the protective element moves simultaneously relative to the camera unit.

3. Device, as claimed in claim 1,
wherein
the drive unit engages directly or indirectly with the camera unit or with the protective element, in order to move the camera unit and the protective element.

4. Device, as claimed in claim 1,
wherein
the protective element is arranged rotatably and/or pivotably about a first axle, and the camera unit is mounted rotatably about a second axle.

5. Device, as claimed in claim 4,
wherein
the first axle and the second axle are arranged at a housing element of the device.

6. Device, as claimed in claim 1,
wherein
the drive unit has a movable driving element, which is operatively connected to the camera unit or to the protective element, in order to move the camera unit or the protective element.

7. Device, as claimed in claim 6,
wherein
the movable driving element of the drive unit is at least a drive rod, which is fastened in a rotationally movable or pivotally movable manner to a linking mechanism at the camera unit or at the protective element, so the at least one drive rod is movable by means of the drive unit.

8. Device, as claimed in claim 6,
wherein
the movable driving element of the drive unit is at least a cam or at least an eccentrically arranged disk, which rests against the camera unit or against the protective element at the camera unit or at the protective element, and, in particular, there is a resilient element, which is fastened to the camera unit or to the protective element and which prestresses the camera unit and the protective element against the at least one cam or the at least one eccentrically arranged disk, so that either the camera unit or the protective element rests permanently against the at least one cam or the at least one eccentrically arranged disk.

9. Device, as claimed in claim 6,
wherein
the movable driving element of the drive unit is at least one gearwheel, which meshes with the gearwheel, which is securely connected to the camera unit or the protective element, in order to move the camera unit and the protective element.

10. Device, as claimed in claim 9,
wherein
the gearwheel at the camera unit is rotatably mounted concentrically about the second axle of the device, or the gearwheel at the protective element is rotatably mounted concentrically about the first axle of the device.

11. Device, as claimed in claim 6,
wherein
the drive unit has a gear unit, which is operatively connected to the driving element, in order to move said driving element.

12. Device, as claimed in claim 1,
wherein
the drive unit has a motor, in particular an electric motor, a hydraulic motor or a pneumatic motor.

13. Device, as claimed in claim 1,
wherein
the camera unit has a guide element, which is held guidably in a connecting link guide of the protective element, or the protective element has a guide element, which is held guidably in a connecting link guide of the camera unit.

14. Device, as claimed in claim 13,
wherein
the connecting link guide of the protective element is configured so as to be linear, and the longitudinal axis of connecting link guide of the protective element points towards or approximately towards the first axle.

15. Device, as claimed in claim 1,
wherein
the drive unit is operatively connected to the camera unit or the protective element in such a way that when the protective element is in the closed position and/or the open position, a movement of the protective element owing to the influence of a force, which is exerted manually from the outside, on the protective element is not possible.

16. Device, as claimed in claim 1,
wherein
the camera unit is arranged at a movably mounted pivot arm, which connects the drive unit to the protective element, so that when the drive unit initiates a movement of the pivot arm, the protective element can be guided into the closed position and into the open position, and the camera unit can be guided into the inactive position and the active position.

17. Device, as claimed in claim 16,
wherein
the drive unit has a crank, which is mounted rotatably about a third axle; the crank has a guide element, which runs parallel to the third axle and can be guided circularly around the third axle during a rotational movement of the crank; and the guide element for moving the pivot arm is operatively connected to the pivot arm.

18. Device, as claimed in claim 17,
wherein
the guide element of the crank and/or the guide element of the second end of the pivot arm is a sliding block or a cam.

19. Device, as claimed in claim 17,
wherein
the guide element of the crank is arranged rotatably at the crank and/or the guide element at the end of the pivot arm that faces the protective element is arranged rotatably at the pivot arm.

20. Device, as claimed in claim 16,
wherein
the end of the pivot arm facing the drive unit has a connecting link guide for moving the pivot arm by means of the drive unit, in particular for guiding the guide element of the crank.

21. Device, as claimed in claim 20,
wherein
the connecting link guide of the pivot arm is configured so as to be linear and/or curved and/or the connecting link guide of the protective element is configured so as to be linear and/or curved.

22. Device, as claimed in claim 16,
wherein
the end of the pivot arm that faces the protective element has a guide element, which is held guidably in a connecting link guide of the protective element.

23. Device, as claimed in claim 22,
wherein
that when the protective element is in the closed position, the guide element of the pivot arm strikes against that end (14*a*) of the connecting link guide of the protective element that faces away from the first axle, and that when the protective element is in the open position, the guide element of the pivot arm strikes against that end (14*b*) of the connecting link guide of the protective element that faces the first axle.

24. Device, as claimed in claim 22,
wherein
the guide element of the pivot arm is arranged laterally at the second end of the pivot arm.

25. Device, as claimed in claim 16,
wherein
the camera unit is arranged on the end of the pivot arm that faces the protective element.

26. Device, as claimed in claim 16,
wherein
the pivot arm is made in one piece or multiple pieces.

27. Device, as claimed in claim 16,
wherein
the pivot arm is designed in an angle-shaped form.

28. Device, as claimed in claim 1,
wherein
the protective element has an emblem.

29. Motor vehicle with a camera unit,
wherein
the vehicle has at least one device, as claimed in claim 1.

* * * * *